United States Patent
Lu

(10) Patent No.: US 6,744,541 B1
(45) Date of Patent: Jun. 1, 2004

(54) SCANNING APPARATUS FOR SCANNING BOTH TRANSPARENT AND REFLECTIVE OBJECTS

(75) Inventor: Jih-Yung Lu, Taipei Hsien (TW)

(73) Assignee: BenQ Corporation, Taoyuan (TW)

( * ) Notice: Subject to any disclaimer, the term of this patent is extended or adjusted under 35 U.S.C. 154(b) by 0 days.

(21) Appl. No.: 09/370,678

(22) Filed: Aug. 9, 1999

(30) Foreign Application Priority Data

Sep. 28, 1998 (TW) ........................................ 87116060 A

(51) Int. Cl.⁷ .................................................. H04N 1/04
(52) U.S. Cl. .......................... 358/497; 358/504; 358/520
(58) Field of Search ................................. 358/497, 474, 358/487, 496, 475, 506, 504, 520; 250/208.1

(56) References Cited

U.S. PATENT DOCUMENTS 4,974,948 A * 12/1990 Arai et al. .................. 350/423
5,907,411 A * 5/1999 Han .......................... 358/487

FOREIGN PATENT DOCUMENTS

CN 1213806 4/1999

* cited by examiner

*Primary Examiner*—Kimberly Williams
*Assistant Examiner*—Negussie Worku
(74) *Attorney, Agent, or Firm*—Ladas & Parry

(57) ABSTRACT

An scanning apparatus for scanning both of a reflective object and a transparent object is disclosed. The scanning apparatus moves the position of the image-retrieving device to switch the work position of the lens in the image-retrieving device. Therefore, the lens can form the image of the reflective object on the image-detecting device while its work position is on the reflective object. On the other hand, the lens can form the image of the transparent object on the image-detecting device while its work position is on the transparent object.

9 Claims, 4 Drawing Sheets

SCANNING APPARATUS FOR SCANNING BOTH TRANSPARENT AND REFLECTIVE OBJECTS

BACKGROUND OF THE INVENTION

1. Field of the Invention

This invention relates to a scanning apparatus, and more particularly to a scanning apparatus being able to scan both transparent and reflective objects.

2. Description of Prior Art

With the increasing widespread of computers and the Internet, more image data is utilized in hypertext documents. Therefore, scanners are very popular. There are various ways to input video data to a computer, for example with digital cameras and scanners, etc. But a scanner is the best choice for inputting images of flat documents such as photographs or slides, etc.

A conventional scanner is generally a reflective scanner. That is, its light source and the image detector are located at the same side of the document to be scanned. Therefore, it can only scan opaque documents, not a film or a slide.

To address this question, various scanners have been provided that is able to scan a transparent document. Referring to FIG. 1, Taiwanese patent application number No. 85213005 provides two sets of light sources 10, 12 to respectively scan a reflective document and a transparent document. Then a revolvable mirror 14 is used to choose one of the light sources to project to the image recording device 18 after passing through reflective mirrors and lens set 16. In this prior art, two sets of light sources 10, 12 and a revolvable mirror 14 are used to choose different light paths. It has a complex structure; thus its cost is relatively high.

To address this weakness, several prior arts can scan both reflective and transparent objects have been developed. Referring to FIG. 2a, Taiwanese patent application No. 85218816 provides a revolving apparatus 20 to enable the light source 22 to switch between particular positions at both sides of the glass plate 24 holding documents to be scanned. Thus, the scanner can scan a reflective object when the light source 22 and image convert device 26 are located at the same side to the glass plate 24, otherwise the scanner can scan a transparent object. However, in order to allow the glass plate 24 to move across the supporting mechanism 20, the mechanism 20 for supporting the light source 22 must be wider than the glass plate 24. Hence the structure of such scanner becomes larger. Referring to FIG. 2b, the U.S. Pat. No. 5,907,411 has disclosed a scanner mechanical structure with a reflective scanning platform 27 and a transparent scanning platform 29. However, two light sources are used for reflective scanning and transparent scanning respectively.

To avoid the problems mentioned above, another scanner using only one light source to scan documents is disclosed. Referring to FIG. 3, in Taiwanese patent application No. 86200497, the light produced by the light source 30 is divided to respectively scan a reflective object 32 and scan a transparent object 34. Different optical components are used to transmit the images of the reflective object 32 and scan the transparent object 34 respectively to a beam splitter 36. Thus the images coming from different optical paths can be transmitted to an image retrieving apparatus 38 by means of the beam splitter 36. However, a mask 39 has to be used to allow only one of the images being transmitted to the image retrieving apparatus 38 at a time. In this prior art, the scanner has a larger volume since it must use more components.

SUMMARY OF THE INVENTION

Accordingly, to address the drawbacks of the prior arts, the object of this invention is to provide an apparatus for scanning both reflective and transparent objects, which uses only one fixed light source to provide an optical path able to respectively scan both a reflective object and a transparent object.

According to the invention, only one set of optical components is needed to scan both a reflective object and a transparent object since there is only one optical path to be used. A reduced number of optical components are used in this scanning apparatus, thus lowering the cost and lessening the physical volume of the scanner.

To attain the above purpose, the invention moves the position of the image-retrieving device to switch the work position of the lens in the image-retrieving device, so that both the image of a reflective object and the image of a transparent object can be precisely formed at an appropriate position.

BRIEF DESCRIPTION OF THE DRAWINGS

The following detailed description, given by way of example and not intended to limit the invention solely to the embodiments described herein, will best be understood in conjunction with the accompanying drawings in which.

DETAILED DESCRIPTION OF THE PREFERRED EMBODIMENTS

Figure 1:
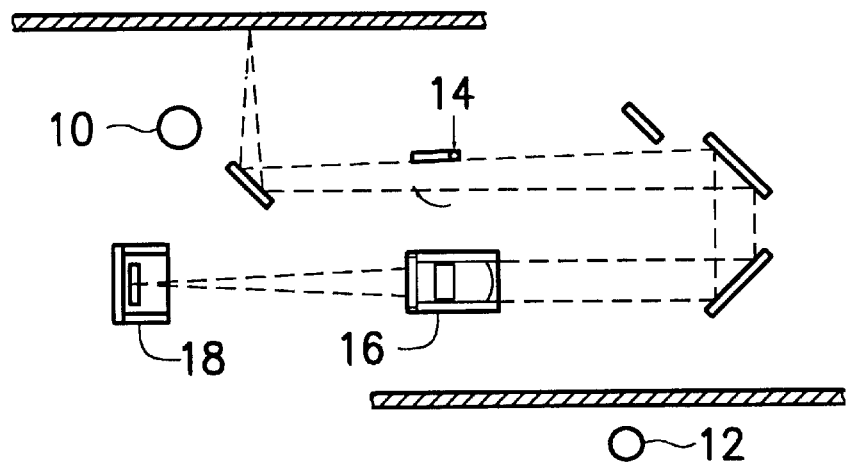
FIG. 1 is a diagram illustrating the structure of a conventional scanner.
Figure 3:
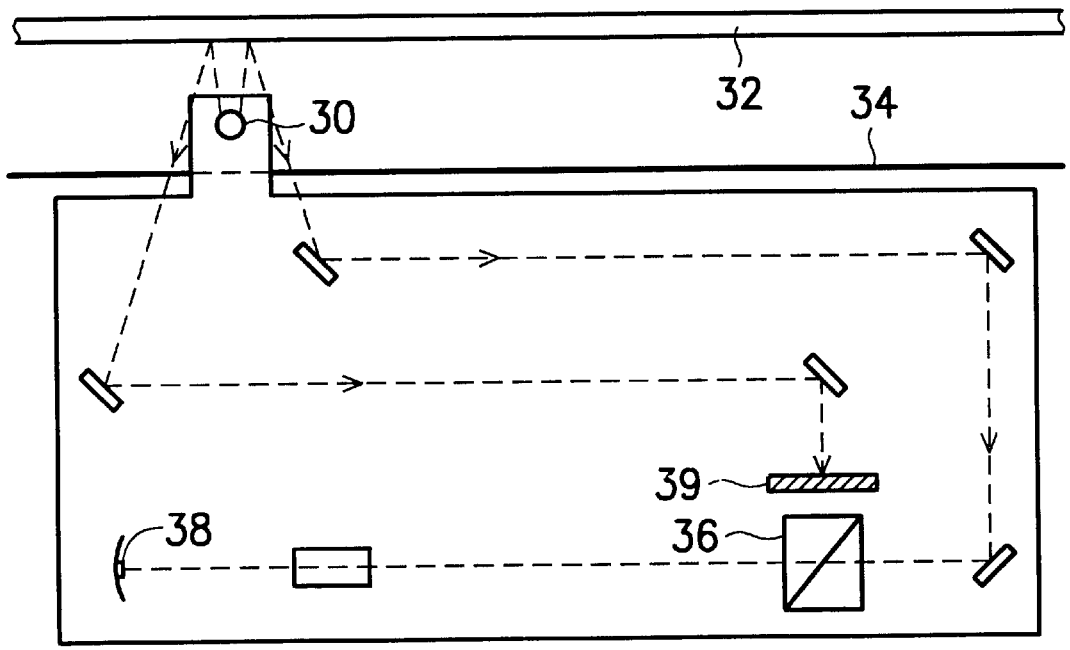
FIG. 3 is a diagram illustrating the structure of another conventional scanner.
Figure 2A:
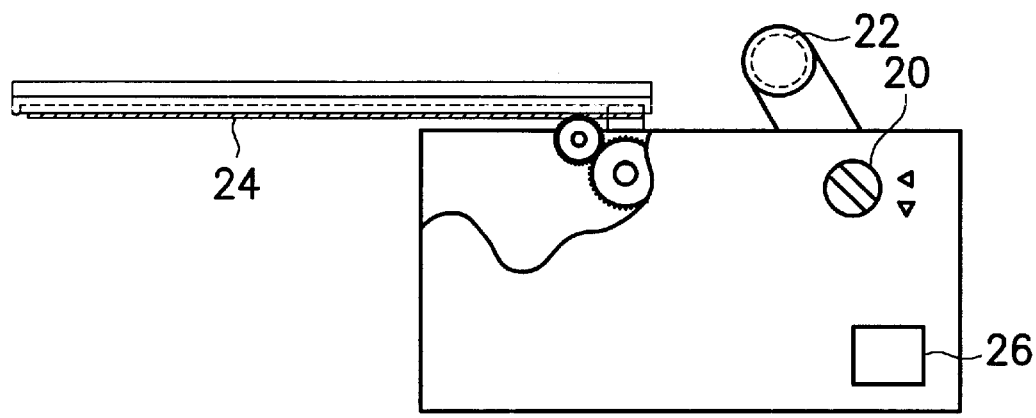
FIGS. 2a and 2b illustrate the structure of another conventional scanner.
Figure 2B:
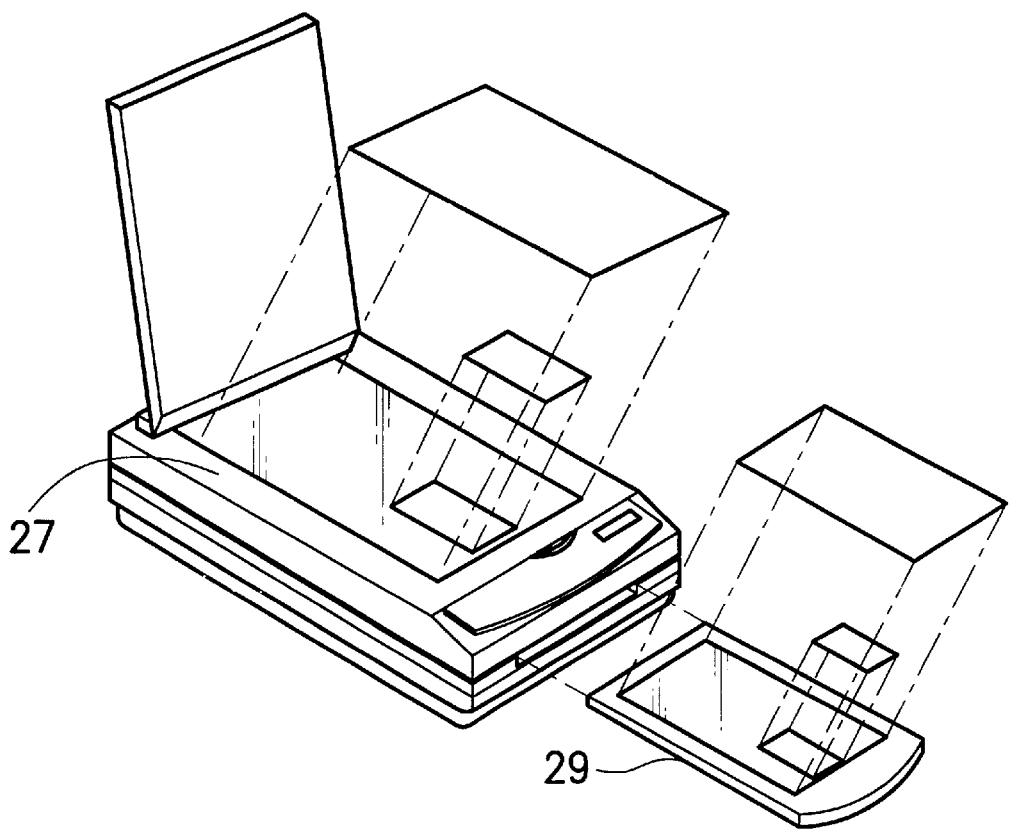
Figure 4A:
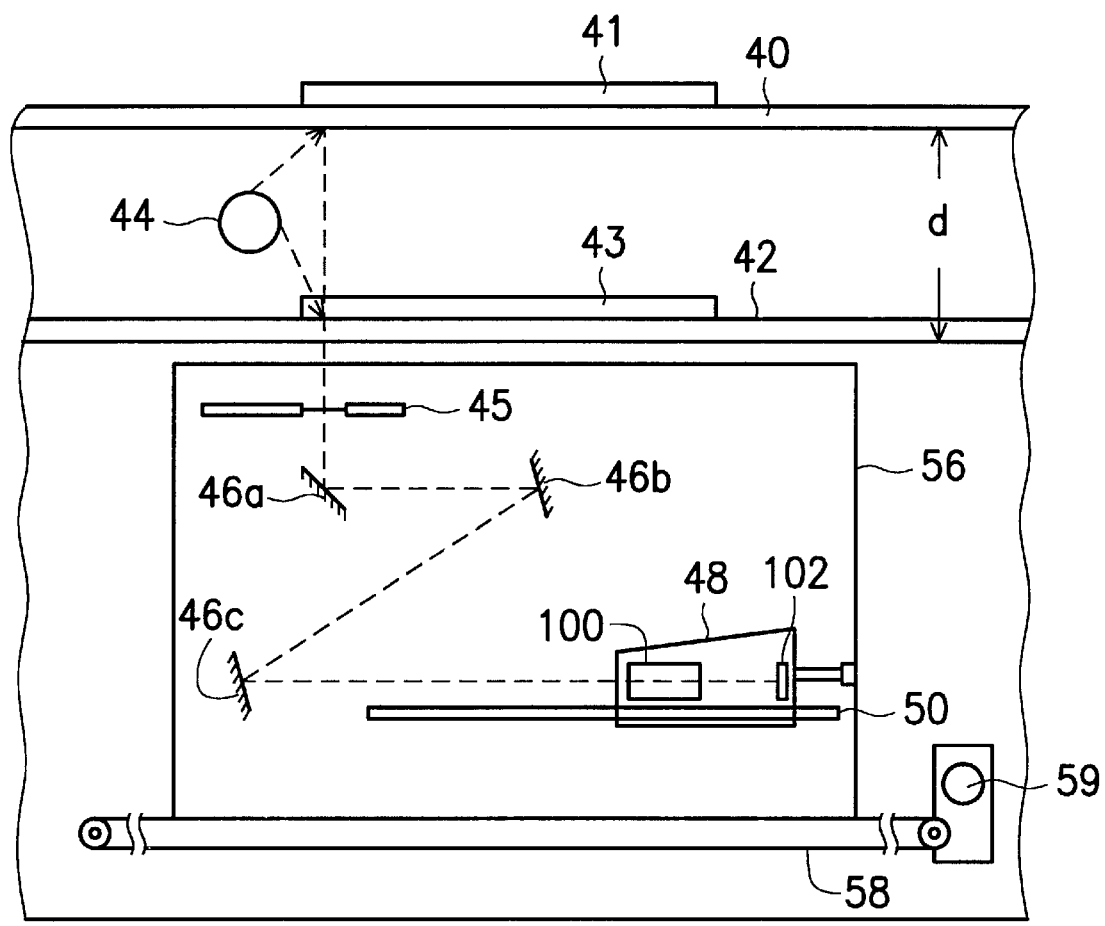
FIG. 4a is a diagram illustrating the structure of an apparatus for scanning both a reflective object and a transparent object according to this invention.

Please refer to FIG. 4a. According to one embodiment of this invention, an apparatus for scanning both a reflective object 41 and a transparent object 43 includes: a reflective scanning platform 40, and a transparent scanning platform 42 which is parallel to and spaced apart from the reflective scanning platform 40 by a certain distance d. The scanning light source 44 is disposed between the reflective scanning platform 40 and the transparent scanning platform 42 for offering the light toward both the reflective object 41 placed on the reflective scanning platform 40 and the transparent object 43 placed on the transparent scanning platform 42. There are a plurality of reflective mirrors 46a, 46b, 46c for changing direction of the optical path for the light reflected by the reflective object 41 or passing through the transparent object. The image retrieving device 48 is disposed in the optical path of the light reflected by the reflective mirrors to receive the image of the object being scanned and convert the image to electrical signals.

In the above structure, the scanning apparatus can further include a grating 45 disposed between the transparent scanning platform and the reflective mirrors to eliminate the noise of the light.

The image-retrieving device 48 includes an imaging device 100 and an image-detecting device 102, wherein the imaging device 100 can be a lens or a lens set, etc., which is a device having a focusing function to focus the image on the image-detecting device 102, and the image-detecting device 102 can be a charge-coupled device (CCD). The image-retrieving device 48 can receive either the light reflected from the reflective object 41 or the light passing through the transparent object 43. Both the light reflected from the reflective object 41 and the light passing through the transparent object 43 enters the image retrieving device 48 along the single (or substantially close) optical path (dot line extended from the grating 45 to image retrieving device 48).

The grating 45, reflective mirrors 46a~46c, and image retrieving device 48 are all supported by the image receiving module 56. The image-receiving module 56 is attached to the transportation means 58, such as a belt, and driven by the motor 59. The image-receiving module 56 can move along the longitude axis of the transparent scanning platform 42.

When the scanning apparatus performs a scanning operation toward either the transparent object 43 or the reflective object 41, in order to maintain a fix relative positional relationship between the image receiving module 56 and the light source 44, both the image receiving module 56 and the light source 44 move simultaneously toward same direction with same velocity.

According to the lens manufacturer formula, if the object distance has been decided, then the image distance is determined since the lens has a fixed focal length. Therefore, the distance from the document to be scanned to the imaging device 100 (object distance) is fixed since the distance between the imaging device 100 and the image detecting device 102 (image distance) is fixed in the above structure. Therefore, there is an object distance difference d for the imaging device 100 between scanning reflective object 41 placed on the reflective scanning platform 40 and scanning a transparent object 43 placed on the transparent scanning platform 42. According to this invention, the whole image retrieving device 48 is moved backward by a distance d to maintain the original object distance to clearly form the image of the document on the image detecting device 102.

Figure 4B:
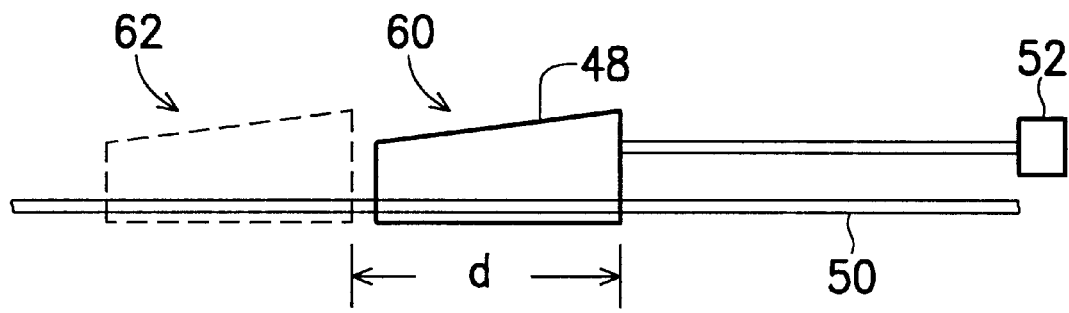
FIG. 4b is a diagram illustrating the position control for the image-retrieving device in the scanning apparatus of this invention.

Referring to FIG. 4b, the image-retrieving device 48 is established on a sliding rail 50 and is driven by a motor 52 to switch between a predetermined first position 60 and a predetermined second position 62 within the image-receiving module 56 along the optical path. The distance between the first position 60 and the second position 62 is same as the object distance difference d. The image-retrieving device 48 is located at the first position 60 while scanning the transparent object 43 to make the image of the transparent object 43 focused on the image detecting device 102 within the image retrieving device 48. On the other hand, the image-retrieving device 48 is located at the second position 62 while scanning the reflective object 41 placed on the reflective scanning platform 40 to make the image of the reflective object 41 focused on the image detecting device 102 within the image retrieving device 48.

Additionally, the image-retrieving device 48 can further include an auto-focus device, which can drive the motor 52 along the optical path to adjust the position of the image retrieving device 48 in accordance with the feedback signal generated according to the received image of the image detecting device 102. Thus, only one of the image of the transparent object 43 and the image of reflective object 41 can be clearly formed on the image-detecting device 102 within the imaging-retrieving device 48.

Figure 4C:
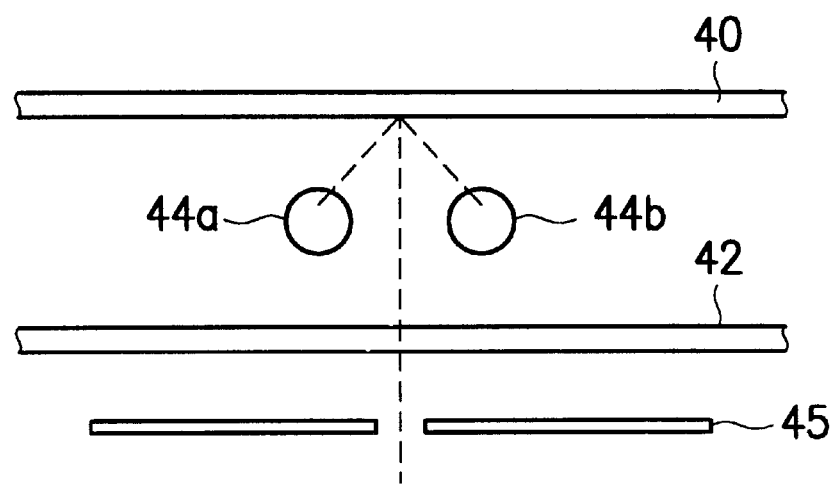
FIG. 4c is a diagram illustrating the light source in the scanning apparatus of this invention.

In the above embodiment, the light source 44 includes a lamp tube. However, this invention is not limited to only one lamp tube. As shown in FIG. 4c, the light source can include two lamp tubes 44a, 44b, or other kinds of light sources.

While the present invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A scanning apparatus capable of scanning both a reflective object and a transparent object comprising:
   a reflective scanning platform capable of holding the reflective object;
   a transparent scanning platform capable of holding the transparent object, said transparent scanning platform being substantially parallel to and spaced apart from said reflective scanning platform;
   a light source disposed between said reflective scanning platform and said transparent scanning platform, for offering the light toward at least one of the reflective object and the transparent object;
   an image receiving module capable of moving within the scanning apparatus;
   a reflective mirror fixed on the image receiving module for changing the direction of the light reflected by the reflective object or the light passing through the transparent object; and
   an image retrieving device movably mounted to the image receiving module, for receiving the light reflected by the reflective mirror, wherein the image retrieving device can be moved independently of the image receiving module to be switched between a first position and a second position to adjust a distance between the reflective mirror and the image retrieving device, so that the image retrieving device is located at the first position while scanning a transparent object disposed on the transparent scanning platform, and is located at the second position while scanning a reflective object disposed on the reflective scanning platform.

2. The scanning apparatus as claimed in claim 1, wherein the transparent scanning platform is substantially parallel to and spaced apart from the reflective scanning platform by a predetermined distance d; and the distance between the first position and the second position is also the predetermined distance d.

3. The scanning apparatus as claimed in claim 1, wherein the scanning apparatus further comprises a sliding rail and a motor, the image-retrieving device is disposed on the sliding rail and is driven by the motor to move between the first position and the second position.

4. The scanning apparatus as claimed in claim 3, wherein the image-retrieving device further comprises an imaging device, an image-detecting device and an auto-focusing device, so that the auto-focusing device determines the focusing of the imaging device as the image detecting device receives an image formed by the imaging device, and accordingly drives the motor to adjust the position of the image retrieving device to make the imaging device precisely form the image on the image-detecting device.

5. The scanning apparatus as claimed in claim 1, further comprising a grating disposed between the transparent scanning platform and the reflective mirror to eliminate noises of light.

6. The scanning apparatus as claimed in claim 1, wherein the light source is a single lamp tube capable of offering light to both the transparent object and the reflective object.

7. A scanning apparatus capable of scanning both a reflective object and a transparent object comprising:
- a reflective scanning platform capable of holding the reflective object;
- a transparent scanning platform capable of holding the transparent object, said transparent scanning platform being substantially parallel to and spaced apart from said reflective scanning platform by a predetermined distance d;
- a light source for offering a light toward at least one of the reflective object and the transparent object;
- an image retrieving device for receiving at least one of the light reflected from the reflective object and the light passing through the transparent object, both the light reflected from the reflective object and the light passing through the transparent object entering the image retrieving device along a single optical path; and
- an image receiving module supporting the image retrieving device, the image receiving module capable of moving along a longitude axis of the transparent scanning platform, the image receiving module having a predetermined first position and a predetermined second position along the optical axis, and the distance between the first position and the second position being the distance d, wherein the image retrieving device is switched between the first position and the second position, so that the image of the transparent object is focused within the image retrieving device when the image retrieving device is located at the first position, and the image of the reflective object is focused within the image retrieving device when the image retrieving device is located at the second position.

8. A scanning apparatus capable of scanning both a reflective object and a transparent object comprising:
- a reflective scanning platform capable of holding the reflective object;
- a transparent scanning platform capable of holding the transparent object, said transparent scanning platform being substantially parallel to and spaced apart from said reflective scanning platform by a predetermined distance d;
- a light source for offering a light toward at least one of the reflective object and the transparent object;
- an image retrieving device for receiving at least one of the light reflected from the reflective object and the light passing through the transparent object, both the light reflected from the reflective object and the light passing through the transparent object entering the image retrieving device along a single optical path;
- an image receiving module supporting the image retrieving device, wherein the image retrieving device can be moved independently of the image receiving module, the image receiving module capable of moving along a longitude axis of the transparent scanning platform; and
- an auto-focusing device disposed in the image retrieving device, so that the auto focusing device can adjust the position of the image retrieving device along the optical path, and only one of the image of the transparent object and the image of the reflective object is clearly focused within the image retrieving device.

9. A scanning apparatus capable of scanning both a reflective object and a transparent object comprising:
- a reflective scanning platform capable of holding the reflective object;
- a transparent scanning platform capable of holding the transparent object, said transparent scanning platform being substantially parallel to and spaced apart from said reflective scanning platform;
- a light source disposed between said reflective scanning platform and said transparent scanning platform, for offering the light toward at least one of the reflective object and the transparent object;
- an image receiving module capable of moving within the scanning apparatus;
- a reflective mirror fixed on the image receiving module for changing the direction of the light reflected by the reflective object or the light passing through the transparent object; and
- an image-detecting device disposed on the image receiving module for receiving the light reflected by the reflective mirror, wherein the image-detecting device can be moved independently of the image receiving module to be switched between a first position and a second position to adjust a distance between the reflective mirror and the image-detecting device, so that the image-detecting device is located at the first position while scanning a transparent object disposed on the transparent scanning platform, and is located at the second position while scanning a reflective object disposed on the reflective scanning platform.

* * * * *